(12) United States Patent
Bone et al.

(10) Patent No.: US 7,944,438 B2
(45) Date of Patent: May 17, 2011

(54) SYSTEM AND METHOD FOR IMPROVING IMAGE QUALITY BY SYNCHRONIZING DISPLAY MODULATION WITH LIGHT SOURCE PULSES

(75) Inventors: Matthew F. Bone, Fremont, CA (US); Justin John Skaife, Earleville, MD (US)

(73) Assignee: OmniVision Technologies, Inc., Santa Clara, CA (US)

( * ) Notice: Subject to any disclaimer, the term of this patent is extended or adjusted under 35 U.S.C. 154(b) by 1066 days.

(21) Appl. No.: 11/787,204

(22) Filed: Apr. 13, 2007

(65) Prior Publication Data
US 2008/0252795 A1    Oct. 16, 2008

(51) Int. Cl.
*G06F 3/038* (2006.01)

(52) U.S. Cl. .......................... 345/204; 345/211; 345/213

(58) Field of Classification Search ............ 345/87–100, 345/204, 211–213
See application file for complete search history.

(56) References Cited

U.S. PATENT DOCUMENTS

| | | | |
|---|---|---|---|
| 6,768,481 B2 | 7/2004 | Ozawa et al. | |
| 2004/0257326 A1 | 12/2004 | Chang | |
| 2005/0062710 A1* | 3/2005 | Kasai et al. | 345/99 |
| 2006/0007219 A1* | 1/2006 | Sakashita | 345/204 |
| 2006/0082560 A1* | 4/2006 | Greer et al. | 345/204 |
| 2006/0238528 A1* | 10/2006 | Kang et al. | 345/204 |
| 2008/0036715 A1* | 2/2008 | Lee et al. | 345/87 |
| 2008/0266224 A1* | 10/2008 | Krijn et al. | 345/88 |

OTHER PUBLICATIONS

UHP Lamp-drivers Specification, EUC 120P/11, Powerpack 120W 20kV, Philips Special Lighting Electronics, CSEUC03004, Revision: 1.4, Nov. 14, 2003, pp. 1-25.

\* cited by examiner

*Primary Examiner* — Kimnhung Nguyen
(74) *Attorney, Agent, or Firm* — Henneman & Associates, PLC; Larry E. Henneman, Jr.

(57) ABSTRACT

A method for synchronizing a light source control signal with modulation of a display includes the steps of receiving a video signal including a synchronization signal (e.g., a Vsync signal) and using the synchronization signal to generate a light source control signals at high and low values. The light source control signal is pulsed between its high and low values between subsequent synchronization signals to cause a light source to produce light pulses at the same time over each frame of the display. Optionally, the low and/or high time periods are adjustable. A novel display driver is also disclosed and includes an input terminal for receiving the synchronization signal, a light source driver for generating the light source control signal in response to the synchronization signal, and an output terminal for providing the light source control signal to a light source control unit.

61 Claims, 7 Drawing Sheets

SYSTEM AND METHOD FOR IMPROVING IMAGE QUALITY BY SYNCHRONIZING DISPLAY MODULATION WITH LIGHT SOURCE PULSES

BACKGROUND OF THE INVENTION

1. Field of the Invention

This invention relates generally to display illumination systems, and more particularly to a light source driver and method that synchronizes light source drive pulses with the modulation of a display.

2. Description of the Background Art

It is well known that projection systems use lamps to illuminate display devices, such as a reflective or transmissive spatial light modulators (SLMs), which modulate the incident light to produce a display image. The lamps of such projection systems are often of the ultra-high pressure (UHP) type, and produce light in a series of rapid pulses.

Display devices typically include an array of pixel cells and are controlled by video signals. Each pixel cell modulates the polarity of incident light responsive to the video signals/data provided to the display device. The pixel cells of the display device are repeatedly updated in a sequential manner. For example, the pixels of the display can be updated row by row starting from the top of the display and proceeding to the bottom row of the display. After the last row of pixel cells is modulated, the process starts over. In this way, the pixel array is rapidly refreshed one frame (i.e., one full display image) of data at a time. The display refresh rates can vary according to country and manufacturer.

One problem associated with projectors of the prior art is that the light pulses produced by the UHP lamp are out of phase with the modulation of the display device. When light pulses are generated at a different rate than the rate at which the display device is refreshed, degradation of the generated image results. Furthermore, even if the generation of light pulses and refreshing of the display begin synchronized, slight variances in the light pulse generation rate of the lamp and the refresh rate of the display device cause the display refresh and the light pulses to gradually "creep" out of phase. The end result of the phase difference to the viewer is a noticeable variance in brightness of the image produced by the display device and, in some cases, unacceptable display flicker.

The problems associated with display flicker caused by lamp pulses have remained largely unresolved to date. Manufacturers have been somewhat deterred from developing a solution, because of the varying display driving standards between different countries and manufacturers. One attempted solution is described in U.S. Patent Application Publication 2004/0257326 (Chang), which discloses a method for synchronizing an oscillation signal produced by a burst mode DC-to-AC inverter driving illumination lamp(s) with the vertical synchronization signal provided to a liquid crystal display (LCD). In particular, the DC-to-AC inverter produces an oscillation signal (Vsawtooth) that controls the production of burst signals (Burst) used to drive the lamp(s). When Vsawtooth is above a reference voltage Vr (i.e., high), then a burst signal is produced. Conversely, when Vsawtooth is below Vr (i.e., low), no burst signal is produced. Each time a synchronization signal Sync is received, the oscillation signal Vsawtooth is pulled low for the duration of the synchronization signal, thereby causing the Burst signal (and lamps) to turn off or remain off. After the lapse of the synchronization signal, Vsawtooth resumes oscillating. In this manner, the cited reference at least somewhat synchronizes the oscillation signal Vsawtooth with the synchronization signal Sync.

The solution of the cited reference is less than satisfactory for more than one reason. First, the Vsawtooth waveform (and thus the lamp) is simply terminated during each vertical synchronization signal and restarted thereafter. Therefore, the lamp is turned on for a partial pulse duration (e.g., as shown in FIG. 2(d) of the cited reference) during each frame of data. This will affect the intensity of the data being displayed and can cause flicker. Further, UHP lamps, are very sensitive to the average DC current across their electrodes. High average DC currents are known to significantly shorten the lifetime of UHP lamps. With the present prior art driving circuit, the partial lamp pulse each frame can cause a DC imbalance, which can accumulate over time.

What is needed, therefore, is an illumination system that can eliminate flicker and/or fluctuations in brightness of a display. What is also needed is a system and method that minimizes any DC imbalance in the driving of light source lamps. What is also needed is a system and method that provides the foregoing advantages for systems with different display refresh rates.

SUMMARY

The present invention overcomes the problems associated with the prior art by providing a light source synchronization system and method that facilitates the synchronization of light source pulses with modulation of a display. The invention facilitates timing the generation of light source pulses, such that the pulses are generated at the same time during each frame of data written to the display.

One method for synchronizing a light source control signal with modulation of a display includes receiving a video signal including a synchronization signal (e.g., a Vsync signal), generating a light source control signal, and using the synchronization signal to adjust a period of the light source control signal. The step of using the synchronization signal to adjust the period of the light source control signal includes the steps of initiating the light source control signal at a first value (e.g., low), maintaining the light source control signal at the first value for a first predetermined time period after receiving the synchronization signal, and changing the light source control signal to a second value (e.g., high) after the lapse of the first predetermined time period. The light source control signal is then maintained at the second value for a second predetermined time period. After the lapse of the second predetermined time period the control signal is changed back to the first value and is asserted for a third predetermined time period. After the lapse of the third predetermined time period, the control signal is changed back to the second value and is asserted for a fourth predetermined time period. After the lapse of the fourth predetermined time period, the control signal is again changed back to the first value and asserted for a fifth predetermined time period.

In the method described above, the synchronization signal causes a display driver to refresh a frame of image data asserted on the display, and the light source control signal causes a light source to generate at least one light pulse. In addition, when synchronization signals are generated at a particular refresh rate, the light source control signal changes value at a rate that is a multiple of the refresh rate. Optionally, the multiple is an even number.

In a particular method, the second predetermined time period is equal to the fourth predetermined time period and/or the third predetermined time period is equal to the fifth predetermined time period. In addition, the sum of the second and third predetermined time periods is equal to the sum of the fourth and fifth, predetermined time periods.

A more particular method includes a step of receiving a second synchronization signal before the lapse of the fifth predetermined time period and comparing the remaining time of the fifth predetermined time period with a predetermined time period. If the times differ, then the method includes the step of adjusting the duration of at least one of the second, third, fourth and fifth predetermined time periods for subsequent generation of the light source control signal. For example, if the remaining time is less than the predetermined time, then adjusting the subsequent time period(s) includes increasing the subsequent time period(s). Alternately, if the remaining time is greater than the predetermined time (e.g., default delay time), then adjusting the subsequent time period(s) includes decreasing the duration of subsequent time period(s).

Another particular method includes the step counting the number of times the value of the light source control signal changes. The method includes the steps of determining the number of light source control signal changes since the receipt of the last synchronization signal before changing the value of the light source control signal, and not changing the value of the light source control signal if the number of light source control signal changes is greater than a predetermined maximum (e.g., 4). The number of times the light source control signal has changed is reset each time a synchronization signal is received.

The methods of the invention may be implemented using an electronically readable medium having code embodied therein for causing an electronic device to perform any of the methods of the present invention.

A display driver for synchronizing a light source control signal with modulation of a display is also disclosed. The display driver includes an input terminal operative to receive a video signal including a synchronization signal, a light source driver responsive to the synchronization signal and operative to generate a light source control signal and to adjust the period of the light source control signal based at least in part on the synchronization signal, and an output terminal operative to provide the light source control signal to a light source control unit. In a more particular embodiment, the display driver further includes a control signal generator and a counter. The counter is operative to process pulse duration values corresponding to control signal pulse durations and provide a count signal indicative of such processing. The control signal generator responsive to the count signal is operative to initiate the light source control signal at a first value, to maintain the light source control signal at the first value for a for a remaining portion of a first predetermined time period, and to change the light source control signal to second value when said count signal indicates the end of said first predetermined time period. The control signal generator is further operative to periodically change the light source control signal between the first value and the second value responsive to count signals from said counter based on second, third, fourth and fifth predetermined pulse duration values.

The display driver also includes a period compensator responsive to the receipt of a second synchronization signal (e.g., a second Vsynch signal in the same synchronization signal) and operative to modify at least one of the second, third, fourth and fifth predetermined pulse duration values to adjust the period of the light source control signal. Depending on the difference between the period of the synchronization signal and the period of the light source control signal, the period compensator is operative to increase or decrease any or all of the predetermined pulse duration values. Thus, a means for adjusting the period of the light source control signal based at least in part on the synchronization signal is provided.

Optionally, the display driver includes a transition counter responsive to the light source control signal changing value and operative to count the number of times the light source control signal changes value. Responsive to a signal from the transition counter, the control signal generator limits the number of pulses in the light source control signal between successive Vsynch signals.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art by providing a light source synchronization system and method, which facilitates synchronization of light source pulses produced by a light source with the modulation of a display device. In the following description, numerous specific details are set forth (e.g., particular discrete components and software/firmware modules, startup routines, etc.) in order to provide a thorough understanding of the invention. Those skilled in the art will recognize, however, that the invention may be practiced apart from these specific details. In other instances, details of well known display circuits and driving methods (e.g., synchronization signal generation, light modulator control, etc.) have been omitted, so as not to unnecessarily obscure the present invention.

Figure 1:
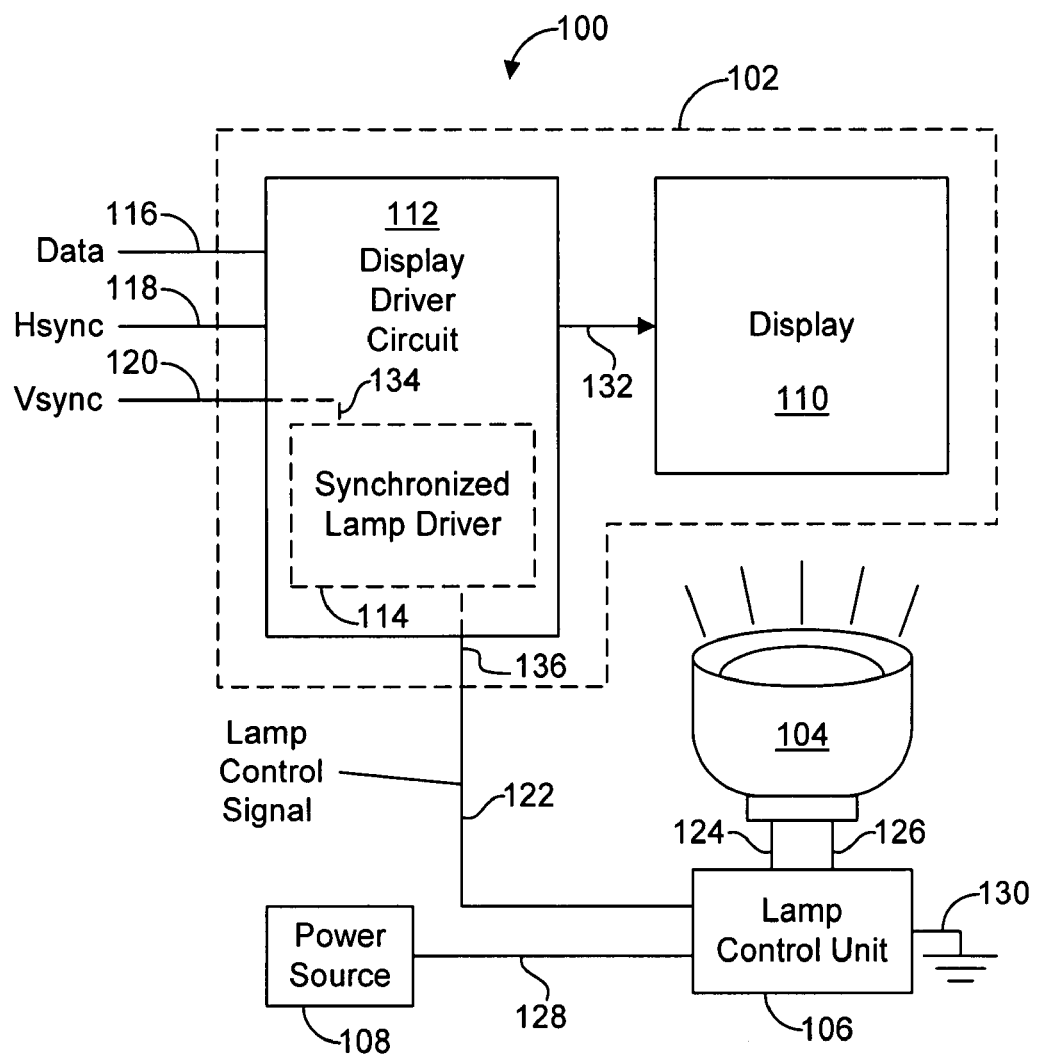
FIG. 1 is a block diagram of a display driver system with a synchronized light source driver according to the present invention.

FIG. 1 shows block diagram of a light source synchronization system 100 according to the present invention. In the present embodiment, light source synchronization system 100 is part of a projection system, and includes a display component 102, a lamp 104, a lamp control unit 106, and a power source 108. Display component 102 includes, but is not limited to, one or more displays 110 and a display driver circuit 112 that includes a synchronized lamp driver 114. Display driver circuit 112 receives display data via data input lines 116, a horizontal synchronization (Hsync) signal via an Hsync line 118 and a vertical synchronization (Vsync) signal via a Vsync line 120. Finally, light source synchronization system 100 includes a control signal line 122 coupled to communicate lamp control signals from synchronized lamp driver 114 to lamp control unit 106.

Lamp 104 illuminates display 110. Lamp 104 includes a first voltage supply terminal 124 and a second voltages supply terminal 126 coupled to receive power from power source 108 via lamp control unit 106, which is also coupled to a common voltage source 130 (e.g., ground). When a sufficient voltage drop is applied across the electrodes (not shown) of lamp 104, lamp 104 conducts electrical current and produces light. In the present embodiment, lamp 104 is an ultra-high pressure (UHP) lamp, and is capable of providing light in a series of high intensity pulses.

Lamp control unit 106 operates lamp 104 responsive to lamp control signals received from synchronized lamp driver 114 via signal line 122. Responsive to the control signal, lamp control unit 106 selectively couples first and second voltage supply terminals 124 and 126 to power source 108 and lamp control unit 106.

Lamp control unit 106 supplies electrical power to lamp 104 in an alternating fashion. Sometimes, lamp control unit 106 supplies first voltage supply terminal 124 with electrical power from power source 108 and connects second voltage supply terminal 126 with common voltage source 130 such that current flows through lamp 104 from first voltage supply terminal 124 to second voltage supply terminal 126 (e.g., in a positive direction). At other times, lamp control unit 106 connects first voltage supply terminal 124 with common voltage source 130 and supplies second voltage supply terminal 126 with electrical power from power source 108 such that current flows through lamp 104 from second voltage supply terminal 126 to first voltage supply terminal 124 (e.g., in a negative direction).

As indicated above, lamp control unit 106 operates responsive to signals received via control signal line 122 from synchronized lamp driver 114. Lamp control unit 106 functions primarily in two modes. In the first mode, lamp control unit 106 is not receiving lamp control signals via control signal line 122, and so lamp control unit 106 pulses lamp 104 at a default rate, for example, at 90 Hz, by supplying lamp 104 with electrical power in an alternating positive-negative fashion. In the second mode, lamp control unit 106 is receiving lamp control signals (e.g., high and low pulses) via control signal line 122. In this mode, lamp control unit 106 causes lamp 104 to generate a light pulse each time a high control signal is received via control signal line 122.

Devices like lamp control unit 106 are commercially available. In this embodiment, lamp control unit 106 is an EUC 120P/11 Powerpack 120 W 20 kV available from Philips Special Lighting Electronics, New York, N.Y.

Power source 108 is a commercially available power source that provides electrical power (i.e., AC current) to lamp control unit 106 (and thus to lamp 104).

Display 110 modulates the light produced by lamp 104 to produce a recognizable video image. In the present embodiment, display 110 is a reflective liquid crystal display (LCD) having an array of liquid crystal pixel cells formed on a silicon substrate (LCOS display). However, it should be understood that any light modulator, for example, transmissive LCDs, or even an array composed of digital micromirror devices (DMDs) could be used with the present invention. Display 110 receives display data (e.g., load signals, image data, etc.) from display driver circuit 112 via one or more data lines 132 in order to modulate the pixel cells of the pixel array to produce a video image. An aspect of the present invention is to synchronize the modulation of display 110 with the light pulses generated by lamp 104.

Display driver 112 updates display 110 based on the data and synchronization signals received via data input lines 116, Hsync line 118, and Vsync line 120. Display driver circuit 112 receives display data (e.g., binary data words) via data input lines 116 and asserts the display data on pixels of display 110 based in part on the synchronization signals received on Hsync line 118 and Vsync line 120. For example, the Hsync signal signifies the beginning of a new row of data on data line 116. The Vsync signal (e.g., a high pulse) on Vsync line 120 indicates that the last row of data has been received and that a first row of data for the next image is the next data to be received. Therefore, if display 110 has 768 rows of pixel cells, display driver circuit 112 would receive 768 Hsync signals for every 1 Vsync signal.

Synchronized lamp driver 114 uses the Vsync signal to generate the lamp control signals provided via signal line 122 to lamp control unit 106. In particular, responsive to receiving each Vsync signal synchronized lamp driver 114 provides control signals to lamp control unit 106 to synchronize the light pulses generated by lamp 104 with modulation of display 110. Synchronized lamp driver 114 includes an input terminal 134 for receiving the Vsync signal on Vsync line 120, and an output terminal 136 for asserting the control signals on control signal line 122. Synchronized lamp driver 114 generates a predetermined number of control signals per frame of display data. In other words, synchronized lamp driver 114 supplies a predetermined number of high and low voltage pulses (control signals) to output terminal 136 for every Vsync signal it receives via input terminal 134. In the present embodiment, as will be described in greater detail below, synchronized lamp driver 114 is operative to generate two high and low lamp control signals for every received Vsync signal. The high control signals cause lamp control unit 106 to provide a high electrical current to lamp 104 to generate a light pulse. The low control signals cause lamp control unit 106 to terminate the electrical current provided to lamp 104.

Synchronized lamp driver 114 also measures the frequency of the Vsync signal received via Vsync line 120, and adjusts the time period of subsequently generated lamp control signals such that the lamp control signals are generated at the same time during each frame of data written to display 110. For example, if for some reason the time between subsequent Vsync signals increases, then synchronized lamp driver 114 will increase the time between high control signals (e.g., increase the low pulse time). Alternately, if the time between subsequent Vsync signals decreases, then synchronized lamp driver 114 will decrease the time between high control signals.

By generating the same number of light pulses at the same time during each frame of video data written to display 110, the present invention greatly reduces or eliminates perceptible display flicker, such as that plaguing unsynchronized display systems of the prior art. In addition, producing light pulses at the same time during every frame of video data provides improved consistency in the intensity of the displayed data. Being able to measure the period of the Vsync signal and adapting the lamp control signal to the measured period of the Vsync signal is especially beneficial, because this aspect of the invention allows synchronized lamp driver 114 to compensate for varying refresh rates (e.g., Vsync generation) that may be encountered in various countries, due to different projector manufacturers, etc.

It should be noted that FIG. 1 does not show all the components of the projector system incorporating light source synchronization system 100 of the present invention. For example, optical components such as lenses, polarizers, analyzers, and the like are omitted so as not to obscure the primary aspects of the present invention. In addition, the circuitry and components of the data source that provides the video data and generates the various input signals used in the present invention (e.g., Hsync, Vsync) are also omitted for the sake of clear explanation.

It should also be noted that the present invention is not limited to projectors, but can be incorporated into any system that illuminates a modulated display with a pulsed light source.

Figure 2:
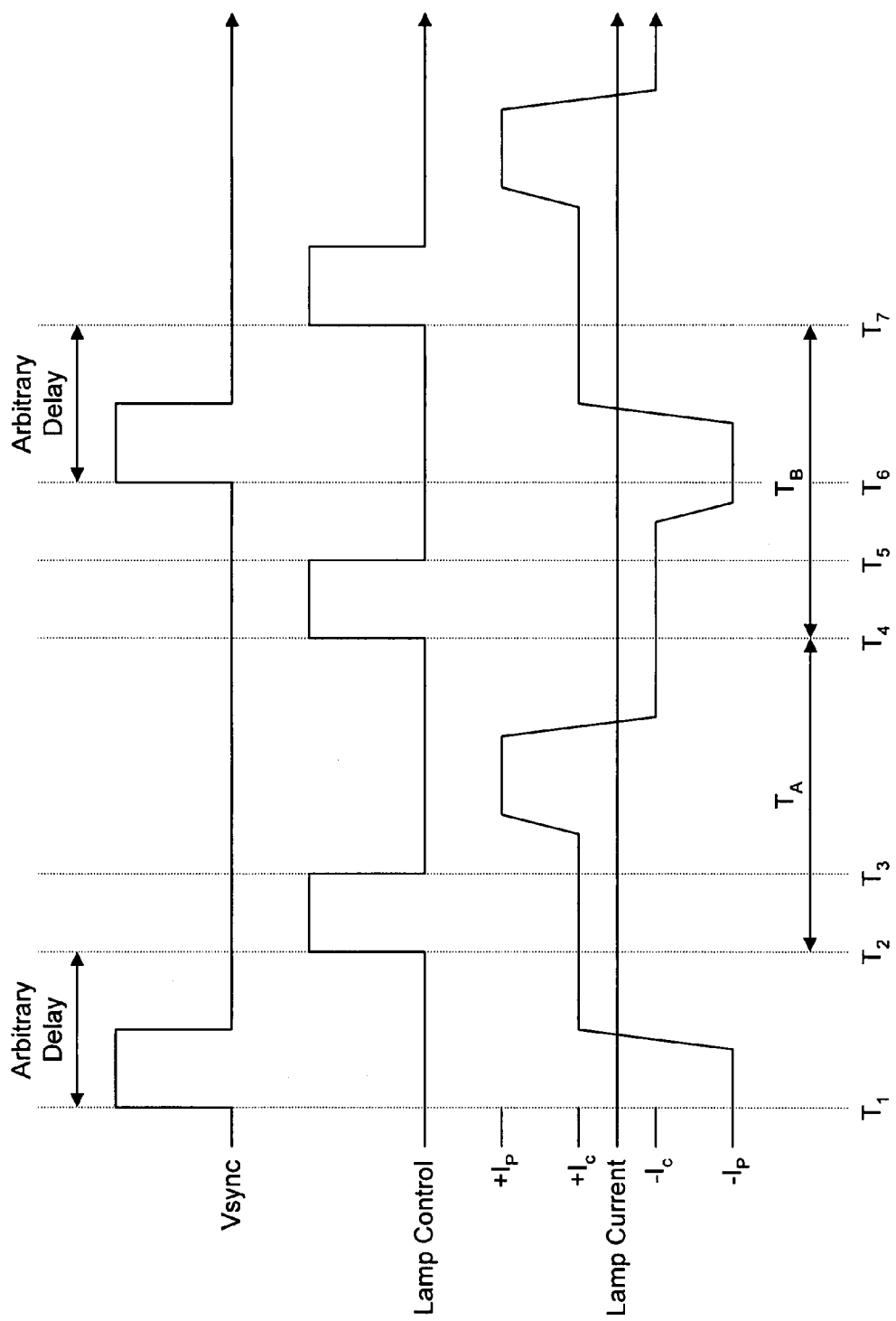
FIG. 2 is a signal diagram showing several signals received or produced by various components of the display driver system of FIG. 1.

FIG. 2 shows a signal timing diagram 200 for various signals received or produced by synchronized lamp driver 114. Diagram 200 also shows the corresponding electrical current through lamp 104. Specifically, diagram 200 includes the Vsync signal received via Vsync line 120 (labeled "Vsync"), the lamp control signal generated by synchronized lamp driver 114 at output terminal 136 (labeled "Lamp Control"), and the current being supplied to lamp 104 by lamp control unit 106 (labeled "Lamp Current"). Note that both Vsync and Lamp Control are voltage pulses, and each have a corresponding high and low state. Lamp 104 is driven by alternating current, and accordingly, has positive and negative current states. In addition, diagram 200 includes several time points ($T_1$-$T_7$), indicating important transitions in one of Vsync, Lamp Control, and/or Lamp Current.

At time $T_1$, the Vsync signal on Vsync line 120 goes high, synchronized lamp driver 114 is asserting a low lamp control signal on output terminal 136, and lamp 104 is conducting a negative pulse of current (−Ip) thereby producing a light pulse. In response to the rising edge of the Vsync, synchronized lamp driver 114 is operative to wait a first predetermined time period (i.e., from $T_1$ to $T_2$, labeled "Arbitrary Delay"), sufficient for lamp control unit 106 to finish generating the negative light pulse current and increase the current supplied to lamp 104 to a steady positive value (+$I_c$). After the lapse of the predetermined delay at time $T_2$, synchronized lamp driver 114 asserts a high Lamp Control signal pulse on signal line 122. Lamp Control then remains high for a second predetermined time period (i.e., $T_2$ to $T_3$) and the Lamp Current remains at the constant positive value (+$I_c$). At time $T_3$, Lamp Control transitions low, and remains low for a third predetermined time period (i.e., $T_3$ to $T_4$).

Responsive to the high lamp control signal pulse from $T_2$ to $T_3$, lamp control unit 106 waits a delay time period, which in the present embodiment is slightly longer than the $T_2$ to $T_3$ time period, and then increases the lamp current to a positive pulse value (+Ip) to cause lamp 104 to generate a light pulse. Accordingly, the Lamp Current is shown increasing from +$I_c$ to a high pulse value (+Ip). After the pulse is generated by lamp control unit 106, the current supplied to lamp 104 by lamp control unit falls to steady negative value (−$I_c$) before time $T_4$.

At time $T_4$, synchronized lamp driver 114 asserts another high lamp control signal on output terminal 136, and so the voltage on lamp control line 122 goes high, as indicated by the rising edge of Lamp Control at $T_4$, and remains high for a fourth predetermined time period ($T_4$ to $T_5$). At time $T_5$, Lamp Control transitions low and remains low for a fifth predetermined time period ($T_5$ to $T_7$).

Responsive to the high lamp control signal from $T_4$ to $T_5$, lamp control unit 106 provides a negative current pulse to lamp 104. Again, before initiating the current pulse, lamp control unit 106 waits a particular delay time, which is slightly longer than the fourth predetermined time period from $T_4$ to $T_5$.

At time $T_6$, synchronized lamp driver 114 detects a second Vsync signal on Vsync line 120, indicated by the rising edge of Vsync on diagram 200. Again, synchronized lamp driver 114 waits an arbitrary delay time period after recognizing the rising edge of the Vsync signal before again asserting a high lamp control signal on output terminal 136 at $T_7$. The delay allows the lamp current provided by lamp control unit 106 to transition from a negative pulse value (−Ip) to the steady positive value (+$I_c$). Note that the arbitrary delay from $T_6$ to $T_7$ is equal to the arbitrary delay from $T_1$ to $T_2$ (the first predetermined time period).

Time $T_6$ indicates the start of a new synchronized lamp pulse cycle. Indeed, the repeating waveforms of Vsync, Lamp Control, and Lamp Current from $T_6$ onward, are generally the same as the waveform from $T_1$ to $T_6$. Note that the second predetermined time period (i.e., $T_2$ to $T_3$) is equal to the fourth predetermined time period ($T_4$ to $T_5$). In addition, the third predetermined time period (i.e., $T_3$ to $T_4$) is equal to the fifth predetermined time period (i.e., $T_5$ to $T_7$). Therefore, as indicated on diagram 200, the sum of the second and third predetermined time periods (labeled $T_A$) is equal to the sum of the fourth and fifth predetermined time periods (labeled $T_B$).

Keeping $T_A$ equal to $T_B$ increases the longevity of lamp 104. As stated above, lamp 104 is a UHP lamp. UHP lamps are very sensitive to the average DC current across their electrodes. Keeping $T_A$ equal to $T_B$ will cause the average DC current across the lamp electrode to be very near zero, because the Lamp Current waveform over $T_A$ is equal in magnitude and opposite in polarity to the Lamp Current waveform over $T_B$. Not keeping $T_A$ equal to $T_B$ could result in a significantly decreased lamp life.

In the United States, Vsync signals are generally received at a rate of approximately 60 Hz. Therefore, because two lamp control signals are generated by synchronized lamp driver 114 for every Vsync signal received, lamp control signals are generated at a rate of approximately 120 Hz. However, it should be noted that lamp control signals can be generated at a higher rate than 120 Hz. Lamp control signals can be generated by synchronized lamp driver 114 at rates in multiples of two (2) of the Vsync rate. For example, four light pulses could be generated between consecutive Vsyncs. Increasing the number of light pulses would increase the average intensity of light output by lamp 104, but would decrease the lifetime of lamp 104. Although it is not entirely necessary to increase the number of lamp pulses in multiples of two of the Vsync rate, it is recommended that multiples of two be used to prolong the life of the lamp as described above.

Because Vsync signals are received at a rate of approximately 60 Hz, the time between Vsync signals can be calculated according to the formula:

$$T = \frac{1}{f},$$

where T is the period between Vsync signals and f is the frequency at which Vsync signals are generated. Accordingly, the time between each Vsync signal is 16.67 milliseconds for a 60 Hz Vsync rate. Therefore, according to the present embodiment, synchronized lamp driver 114 must generate two complete low pulses and two complete high pulses within 16.67 milliseconds because lamp control signals are generated twice as fast as Vsync signals. Therefore, each lamp control signal period takes approximately 8.3 milliseconds. The inventor has found that acceptable time periods for the high pulse and low pulse durations of the control signals are 2 milliseconds and 6.3 milliseconds, respectively. Accordingly, the time periods $T_2$ to $T_3$ and $T_4$ to $T_5$ are each 2 milliseconds long, and the time periods $T_3$ to $T_4$ and $T_5$ to $T_7$ are each 6.3 milliseconds long. It has also been found by the inventors that an arbitrary delay period (e.g., $T_1$ to $T_2$ and $T_6$-$T_7$) of approximately 3.0 milliseconds of the low pulse time is sufficient to give synchronized lamp driver 114 time for the lamp current delivered to lamp 104 to stabilize as described above.

As stated above, synchronized lamp driver 114 adjusts the time duration of one or more of the pulse segments of the lamp control signal asserted on control line 122 to compensate for variances in the times between consecutive Vsyncs. In the present embodiment, synchronized lamp driver 114 is operative to adjust the low pulse time periods of the control signal. The inventors have also found that 3.0 milliseconds arbitrary delay discussed above is also sufficient for synchronized lamp driver 114 to adjust the length of subsequent low control signal time periods should the time between Vsync signals vary from 60 Hz.

Adjustments to the low pulse control signal time periods are made as follows. If the time between subsequent Vsync signals increases, the duration of the time periods $T_3$ to $T_4$ and $T_5$ to $T_7$ should also be increased. In a particular embodiment, synchronized lamp driver 114 adds one half the total time increase between subsequent Vsyncs to both the third and fifth predetermined time periods (i.e., the low segments of the lamp control signal). Alternately, if the time between subsequent Vsync signals decreases, then synchronized lamp driver decreases the third and fifth predetermined time periods by one half of the difference in time between consecutive Vsync periods. In an alternate embodiment, the time increase or decrease could be added to the high pulse periods or a combination of the high and low pulse periods instead.

Again, the fact that the time periods between lamp control signals are adjustable provides an important advantage, because the present invention can operate satisfactorily in different countries where the Vsync rate is not the same. As stated above, the vertical refresh rate of displays in the U.S. is approximately 60 Hz. Displays used in Europe, for example, refresh at a different rate, approximately 50 Hz. Because the synchronized lamp driver 114 of the present invention is able to compensate for varying Vsync signal rates, the present invention can readily be incorporated into systems around the world.

Figure 3:
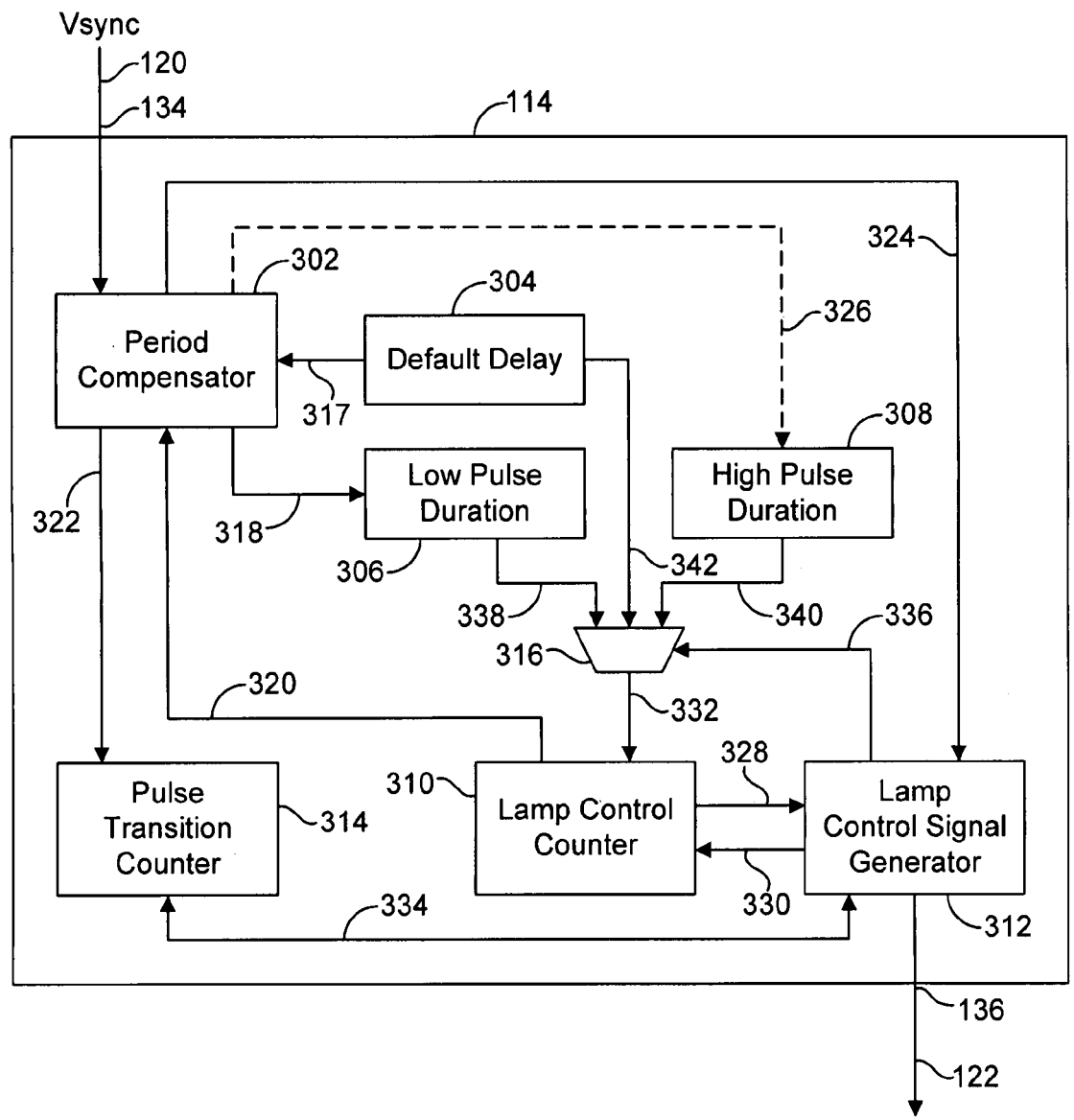
FIG. 3 is a block diagram showing the synchronized lamp driver of FIG. 1 in greater detail.

FIG. 3 is a block diagram showing one example embodiment of synchronized lamp driver 114. In this example embodiment, synchronized lamp driver 114 includes a period compensator 302, a default delay register 304, a low pulse duration register 306, a high pulse duration register 308, a lamp control counter 310, a lamp control signal generator 312, a pulse transition counter 314, and a multiplexer 316.

In the present embodiment, period compensator 302 provides a means for adjusting the period of the lamp control signals to synchronized lamp driver 114 to the Vsync signal. Period compensator 302 receives Vsync signals via input terminal 134, is able to read a default delay value from default delay register 304 via a connection 317, and is able to modify the value stored in low pulse duration register 306 via a connection 318. Period compensator 302 is further able to read values from lamp control counter 310 via a connection 320, can reset pulse transition counter 314 via a connection 322, and can provide instructions to lamp control signal generator 312 via a connection 324. In an alternate embodiment, period compensator 302 can adjust the value stored in high pulse duration register 308 via a connection 326 (shown dashed). Finally, during startup of synchronized lamp driver 114, period compensator 302 is operative to send a start signal to lamp control signal generator 312 via connection 324 to instruct lamp control signal generator 312 to load the value stored in default delay register 304 into lamp control counter 310 and to assert a low control signal onto output terminal 136.

Lamp control counter 310 provides a count value to period compensator 302 via connection 320, provides the count value to lamp control signal generator 312 via a connection 328, and receives a load signal from lamp control signal generator 312 via a connection 330. Responsive to the load signal, lamp control counter 310 is operative to load a new count value asserted on an output line 332 of multiplexer 316. In the present embodiment, lamp control counter 310 is a "count up" style counter. That is, lamp control counter 310 will count up from a loaded negative value to a final value of zero (0). Because lamp control counter 310 is a "count-up" style counter, the values contained in default delay 304, low pulse duration 306, and high pulse duration 308 will be negative count values that correspond to their associated delay, low pulse, and high pulse time periods, respectively. Alternately, other types of counters can be used with the present invention.

Lamp control signal generator 312 is operative to assert a high or low lamp control signal (e.g., a high or low voltage) on output terminal 136. Each time lamp control signal generator 312 alters the value of the lamp control signal asserted on output terminal 136, lamp control signal generator 312 is operative to increment pulse transition counter 314 via a connection 334. Lamp control signal generator 312 is also operative to read pulse transition counter 314 via connection 334 to determine its value. If the value of pulse transition counter 314 is above a predetermined value, lamp control signal generator 312 is further operative to prevent the value (e.g., a low value) of the lamp control signal asserted on output terminal 136 from changing. In addition, signal generator 312 is operative to read the value of lamp control counter 310 via connection 328, and to cause lamp control counter 310, via connection 330, to load the value asserted on output lines 332 of multiplexer 316. Lamp control signal generator 312 also provides a control signal to multiplexer 316, via connection 336, to cause multiplexer 316 to assert either the value stored in default delay register 304, low pulse duration register 306, or high pulse duration register 308 onto output lines 332. Finally, lamp control signal generator 312 receives input from period compensator 302 that is used to modify the value of the lamp control signal asserted on output terminal 136, and during startup, responsive to a start signal received from period compensator 302, is operative to load the value from default delay register 304 into lamp control counter 310.

Pulse transition counter 314 provides a means for counting pulse transitions. In particular, pulse transition counter 314 is operative to count the number of times the value of the control signal asserted by lamp control signal generator 312 onto output terminal 136 changes between two consecutive Vsyncs. Pulse transition counter 314 receives a reset signal via connection 322 each time period compensator 302 receives a Vsync signal. In addition, pulse transition counter is operative to provide a pulse transition count to lamp control signal generator 312 via connection 334, and to increment the pulse count responsive to feedback from lamp control signal generator 312 via connection 334.

Multiplexer 316 selectively asserts the value stored in one of default delay register 304, low pulse duration register 306, or high pulse duration register 308 onto output terminal set 332, responsive to the control signal asserted on line 336 by lamp control signal generator 312. In the present embodiment, the value stored in low pulse duration register 306 is asserted onto a first input terminal set 338 of multiplexer 316, the value stored in high pulse duration register 308 is asserted on a second input terminal set 340, and the value stored in default delay register 304 is asserted onto a third input terminal set 342. Depending on the control signal asserted by lamp control signal generator 312 on load line 336, multiplexer 316 selectively couples either first input terminal set 338, second input terminal set 340, or third input terminal set 342 with output terminal set 332.

The interconnections between the components of lamp driver 114 are shown as single lines so as not to unnecessarily complicate the view of FIG. 3. However, it should be understood that each line represents a set of lines sufficient to communicate the required signal. In some cases, a single line may be sufficient. In other cases, the set of lines will include several lines. For example, the control signal asserted on load line 336 must be able to select between three different inputs. Therefore, load line 336 would need to communicate a two-bit control signal.

Synchronized lamp driver 114 provides lamp control signals at output terminal set 136 as follows. Upon detecting a second or subsequent Vsync signal on input terminal 134, period compensator 302 reads the value remaining in lamp control counter 310, and then instructs lamp control signal generator 312 to set the lamp control signal to a low value. Next, period compensator 302 reads the value stored in default delay register 304 and compares the remaining value read from lamp control counter 310 with the default delay value in default delay 304. If the values differ, period compensator 302 will adjust the value stored in low pulse duration 306 to compensate for the difference.

For example, if a subsequent Vsync signal was late and the value read from lamp control counter 310 was greater (i.e., less negative) than the default delay value, then period compensator 302 would decrease the value stored in low pulse duration register 306 (i.e., make the value more negative) in order to increase the duration of subsequent low pulses. Again, please note that the value loaded into low pulse duration register 306 will be used with the "count-up" lamp control counter 310, wherein decreasing the value (i.e., making the value more negative) will make the value stored in counter 310 more negative, thereby increasing the count duration. Alternately, if a subsequent Vsync signal was early and the value read from lamp control counter 312 was less than (i.e., more negative) than the default delay value, then period compensator 302 would increase the value stored in low pulse duration register 306 (i.e., make the value more positive) in order to decrease the duration of subsequent low pulses.

In a particular embodiment, the difference between the remaining delay read from lamp control counter 310 is divided among each low period that is supposed to occur between successive Vsync signals. For example, the embodiment shown in FIG. 2 has two low time periods between Vsync signals. Accordingly, an adjustment equal to half the difference between the remaining value read from lamp control counter 310 and the default value stored in default delay register 304 will be added or subtracted to the value stored in low pulse duration register 306.

Finally, after adjusting the value stored in low pulse duration register 306, period compensator 302 resets pulse transition counter 314 to a value of zero. Unlike lamp control counter 310, pulse transition counter 314 is reset to a value of zero (0) and is positively incremented.

Lamp control signal generator 312 continuously asserts either a low or high voltage pulse signal onto output terminal 136 for a count time stored in lamp control counter 310. When lamp control counter 310 reaches its final value (e.g., zero) lamp control signal generator 312 is operative to selectively change the value of the lamp control signal asserted on output terminal 136. Assuming a Vsync has just been received on input 134, lamp control signal generator 312 is normally asserting a low lamp control signal on output terminal 136, and pulse transition counter 314 is reset to a value of zero. When lamp control counter 310 counts down to its final value of zero (e.g., completing the arbitrary delay time period/first predetermined time period of FIG. 2), lamp control signal generator 312 changes the value of the lamp control signal applied to output terminal 136 as follows. First, lamp control signal generator 312 asserts a load signal on load line 336 of multiplexer 316 and on the load terminal of lamp control counter 310 via connection 330 causing lamp control counter 310 to load the value stored in high pulse duration register 308. Next, lamp control signal generator 312 determines if the count value stored in pulse transition counter 314 is less than a predetermined number (e.g., 4 transitions). If so, lamp control signal generator 312 changes the value of the lamp control signal asserted on output terminal 136 from low to high and increments pulse transition counter 314 by one.

Next, lamp control counter 310 counts up the loaded high pulse duration value. Then, responsive to lamp control counter 310 again arriving at a final value (e.g., zero), lamp control signal generator 312 loads the value from low pulse duration register 306 into lamp control counter 310 by asserting a load signal onto load line 336 and onto the load terminal of counter 310 via connection 330. Accordingly, the value stored in low pulse duration register 306 is loaded into lamp control counter 310. Then, lamp control signal generator 312 determines if the value stored in pulse transition counter 314 less than the predetermined value (e.g., 4 transitions), and if so asserts a low lamp control signal value on output terminal 136, and increments pulse transition counter 314 by one.

In the above-described manner, lamp control signal generator 312 will alternately assert high and low voltage pulses on output terminal 136, until the value stored in pulse transition counter exceeds a predetermined number (e.g., four) of transitions. Accordingly, as long as Vsync signals arrive approximately when expected, pulse transition counter 314 will be reset before the predetermined maximum number of transitions is reached and synchronized lamp driver 114 will continuously provide control signals to lamp control unit 106.

If a Vsync signal fails to arrive, and pulse transition counter 314 counts at or above the predetermined maximum value (e.g., 4 transitions) synchronization of the lamp control signals with the modulation of the display resets, and the next received Vsync is processed according to startup procedures discussed below. If lamp control signal generator 312 determines that the predetermined maximum of pulse transitions has been met or exceeded, lamp control signal generator 312 ceases generating high lamp control signals, and sets lamp control counter to a NULL value. Alternately, another means of indicating a startup condition to period compensator 302 and lamp control signal generator 312 could be used, such as a single bit flag, instead of setting lamp control counter to a startup value.

During startup or after a reset, lamp control counter 310 is set to a NULL value, such that lamp control signal generator 312 is not producing high lamp control signals. In addition, default delay register 304, low pulse duration register 306, and high pulse duration register 308 can be loaded with default values if necessary. Such values will correspond, for example, with counting values that would yield default delay times, high pulse duration times and low pulse duration times of 3.0 ms, 2.0 ms, and 6.3 ms, respectively. When lamp control signal generator 312 determines that lamp control counter 310 is at a NULL value, lamp control signal generator 312 waits to receive a start signal from period compensator 302 via connection 324.

Responsive to receiving a first Vsync signal on input terminal 134, period compensator 302 generates a start signal to lamp control signal generator 312 via connection 324, which causes lamp control signal generator 312 to assert a low lamp control signal on output terminal 136. Then, lamp control signal generator 312 causes lamp control counter 310 and multiplexer 316 to load the default delay time period stored in default delay register 304 into lamp control counter 310, at which point lamp control counter 310 begins counting and lamp control signal generator continues the processes described above.

Figure 4:
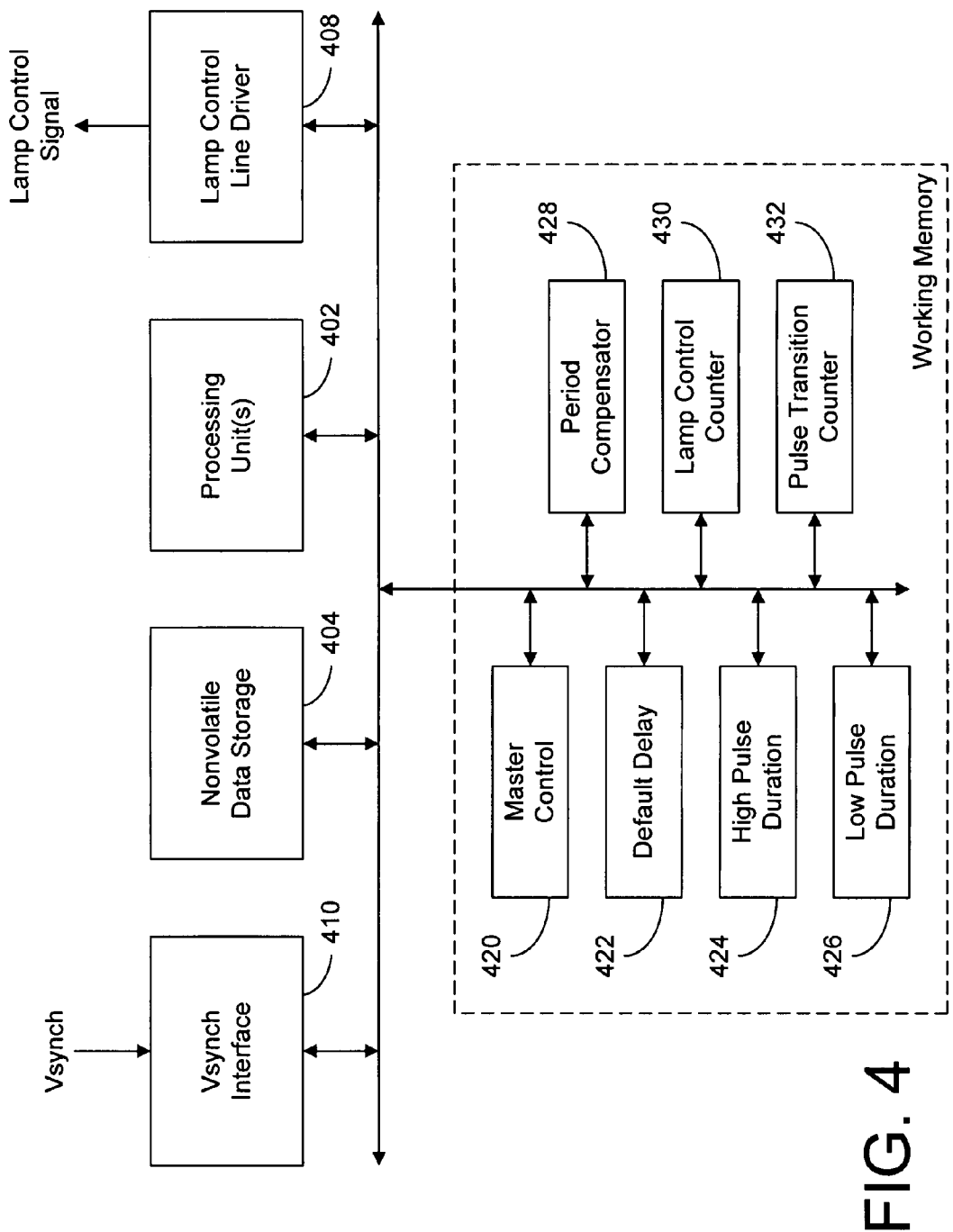
FIG. 4 is a block diagram showing an alternate embodiment of the synchronized lamp driver of FIG. 1.

FIG. 4 is a block diagram showing an alternate embodiment 114A of synchronized lamp driver 114 such as may be implemented on a general purpose computer, a dedicated microprocessor based system, or within a processor based projection system. It should be understood that the invention can be implemented in hardware, software, firmware, or any combination thereof.

In the example embodiment of FIG. 4, synchronized lamp driver 114A includes one or more processing units 402, nonvolatile data storage 404, working memory 406, a lamp control line driver 408, and Vsync interface 410, all intercommunicating via a system bus 412. Nonvolatile data storage 404 (e.g., read-only memory, fixed disk drives, removable media drives, etc.) stores data and executable code and retains the data and code even when lamp driver 114A is powered down. Processing unit 402 imparts functionality to lamp driver 114A by executing the code stored in nonvolatile data storage 404. Working memory 406 (e.g., random access memory) provides temporary storage for use by processing unit 402. For example, processing unit 402 can transfer data and code from nonvolatile data storage 404 into working memory 406, and then execute the code from and manipulate the data within working memory 406. Lamp control line driver 408 is an interface for asserting the lamp control signal on signal line 122 (FIG. 1). Vsync interface 410 receives Vsync signals via line 120 (FIG. 1) and notifies (e.g., via an interrupt line or the like) processing unit 402 when each Vsync signal is received.

In order to effectively illustrate the operation of lamp driver 114A, working memory 406 is shown to include a number of functional code modules and data values. However, it should be understood that the data and code need not reside in any particular location or any particular grouping within working memory 406. For example, one or more of the code modules shown can be combined into a single code module or software routine. Alternatively, one or more of the functional modules shown can be divided into a plurality of sub-routines. Indeed, there exist a great many possibilities for programming lamp driver 114A to provide the functionality disclosed herein, and all such alternative programming possibilities are considered to be within the scope of the invention.

The functional code modules and data values of working memory 406 include a master control module 420, a default delay value 422, a high pulse duration value 424, a low pulse duration value 426, a period compensator module 428, a lamp control counter 430, and a pulse transition counter 432. Master control module 420 monitors Vsync interface for receipt of Vsync signals and provides overall control and coordination of the operation of lamp driver 114A based on those signals. Default delay value 422 is indicative of a default delay time period (e.g., the "arbitrary delay" described in FIG. 2). High pulse duration value 424 is indicative of the duration of each high pulse (e.g., $T_2$ to $T_3$ and $T_4$ to $T_5$ of FIG. 2) of the lamp control signal asserted by lamp control line driver 408. Low pulse duration value 426 is indicative of the duration of each low pulse (e.g., $T_3$ to $T_4$ and $T_5$ to $T_7$ of FIG. 2) of the lamp control signal. Period compensator 428 adjusts either or both of high pulse duration value 424 and low pulse duration value 426 to synchronize the lamp control signal with the incoming Vsync signals. Lamp control counter 430 processes the default delay value 422, high pulse duration value 424, and low pulse duration value 426, in order to control the duration of the high and low pulses of the lamp control signal. Finally, pulse transition counter 432 counts the number of transitions in the lamp control signal since the receipt of the last Vsync signal.

During normal operation, alternate lamp driver 114A functions as follows. Master control module 420 monitors Vsync interface 410 to determine when a Vsync signal is received. When a Vsync signal is received, master control module 420 resets pulse transition counter 432 and causes lamp control line driver 408 to output a low lamp control signal pulse. Master control module 420 also calls lamp control counter 430 to count (up or down) default delay value 422 to determine the duration of the low lamp control signal being asserted. When lamp control counter 430 is finished counting default delay value 422, master control module 420 checks pulse transition counter 432 to determine whether the maximum number of transitions has occurred since the last Vsync signal. If not, then master control module 420 causes lamp control line driver 408 to assert a high lamp control signal, increments pulse transition counter 432, and calls lamp control counter 430 to count high pulse duration value 424. When lamp control counter 430 is finished counting high pulse duration value 424, master control module 420 causes lamp control driver 408 to assert a low lamp control signal and calls lamp control counter 430 to count low pulse duration value 426. When lamp control counter 430 is finished counting low pulse duration value 426, master control module 420 checks pulse transition counter 432 to determine whether the maximum number of transitions has occurred since the last Vsync signal. If not, then master control module 420 causes lamp control line driver 408 to assert a high lamp control signal, increments pulse transition counter 432, and calls lamp control counter 430 to count high pulse duration value 424. This process continues as described, alternating between high and low lamp control signals, until either the next Vsync signal is received or the pulse transition counter indicates the predetermined maximum number of transitions between consecutive Vsync signals.

Period compensator 428 maintains synchronization between the incoming Vsync signals and the output lamp control signal, by adjusting one or both of high pulse duration value 424 and low pulse duration value 426. In particular, period compensator 428 monitors Vsync interface 410 for the receipt of Vsync signals. Upon receipt of each Vsync signal, period compensator 428 reads the current value of lamp control counter 430 to determine whether that value corresponds to an expected value. If the current value and the expected value are the same, then no compensation is necessary. However, if the current value and the expected value are different, then period compensator 428 will adjust high pulse duration value 424 and/or low pulse duration value based on that difference. For example, if lamp control counter had counted past the expected value by an additional count of 20, and if two low pulses occur between consecutive Vsync signals, then period compensator 428 can compensate by decreasing low pulse duration value 426 by 10. Alternatively, period compensator 428 could compensate for the 20 count overshoot by decreasing high pulse duration value 424 by 10. As yet another example alternative, period compensator 428 could decrease both high pulse duration value 424 and low pulse duration value 426 by 5 each. Note also that had lamp control counter 430 not yet reached the expected value when the Vsync signal arrived, period compensator 428 would decrease high pulse duration value 424 and/or low pulse duration value 426 to provide the necessary adjustment.

Figure 5:
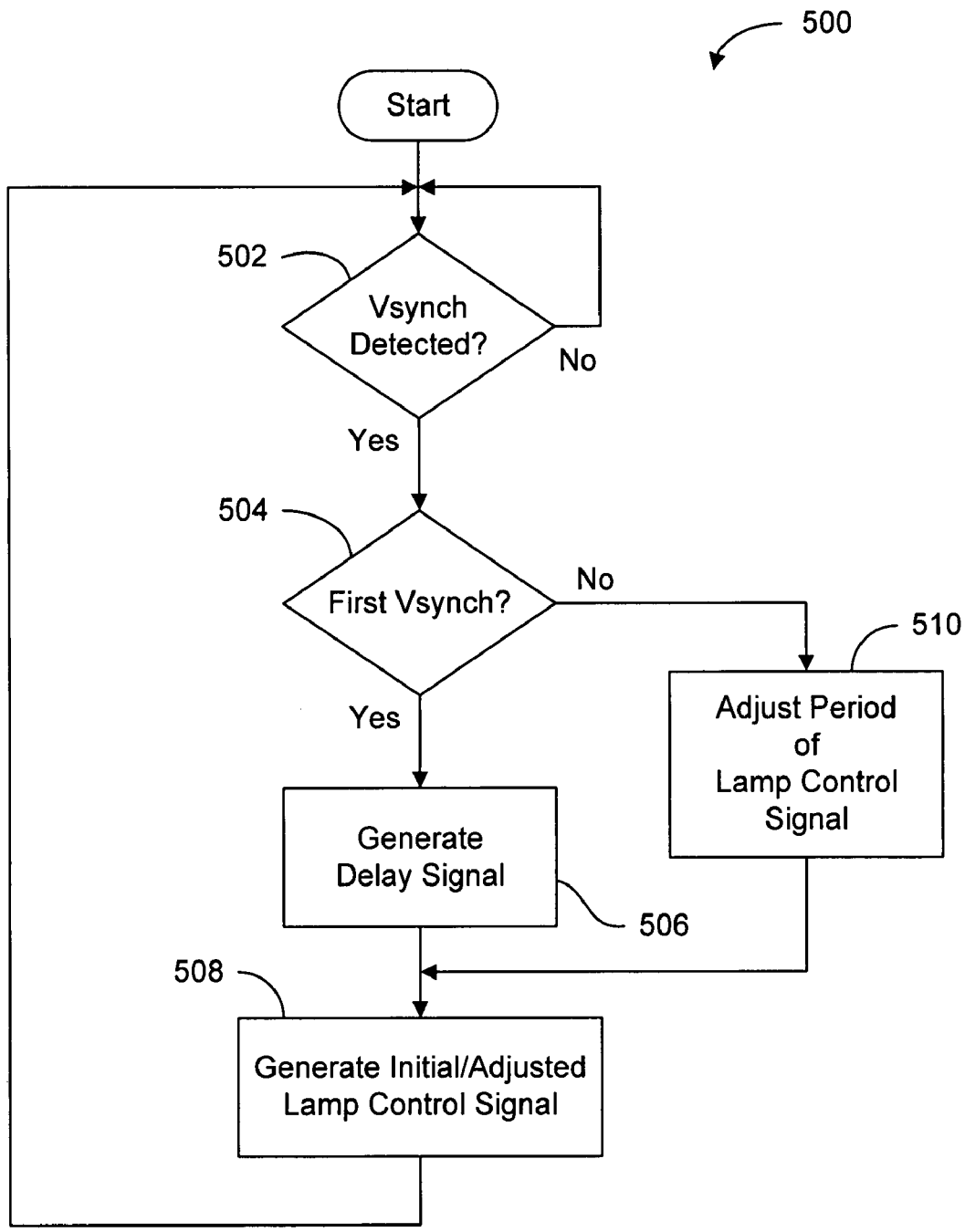
FIG. 5 is a flowchart summarizing one example method for synchronizing a lamp control signal with a video signal according to the present invention.

FIG. 5 is a flowchart summarizing one example method 500 of synchronizing a light source control signal with a video signal according to the present invention. In a first step 502 the lamp control circuit waits for a Vsync signal. If no Vsync signal is received, the lamp control signal continues to wait. When a Vsync signal is received, then in a second step 504 the lamp control circuit determines whether the received Vsync signal is the first of such signals. If so, then in a third step 506 the lamp control circuit generates a delay lamp control signal. In the embodiments described with reference to the previous drawings, the delay signal is a low lamp control signal that is maintained for a predetermined arbitrary time period sufficient to allow the lamp current to stabilize after the preceding pulse. Next, in a fourth step 508, the lamp control circuit generates a lamp control signal (e.g., a series of high and low pulses) configured to drive the lamp between consecutive Vsync signals. If in second step 504 it was determined that the received Vsync signal was the first such Vsync signal, then the lamp control signal generated in fourth step 508 will be an initial (not yet adjusted) lamp control signal. In other words, the duration of the signal will be based on predetermined values estimated to correspond to a standard frequency of a Vsync signal. After the lamp control signal is generated in fourth step 508, method 500 returns to first step 502 and waits for the next Vsync signal.

If, in second step 504, it is determined that the received Vsync signal is not the first Vsync signal, then method 500 proceeds to a fifth step 510 where the lamp control circuit adjusts the period of the lamp control signal to correspond to the actual time between the two previously received Vsync signals. Then, method 500 proceeds to fourth step 508, where the lamp control circuit generates an adjusted lamp control signal having the adjusted period.

Figure 6:
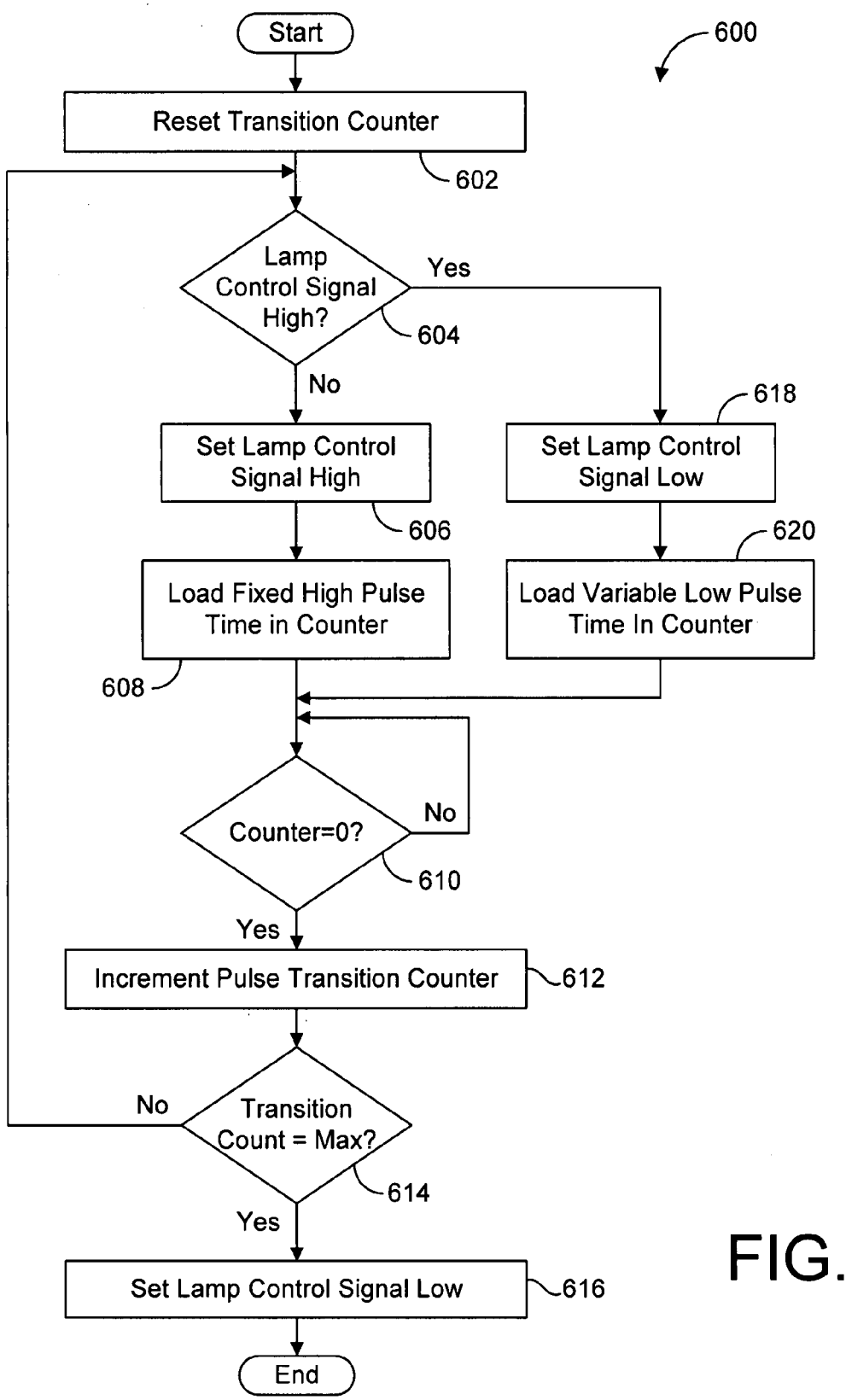
FIG. 6 is a flowchart summarizing one example method for performing the fourth step (generate lamp control signal) of the method of FIG. 5.

FIG. 6 is a flowchart summarizing one example method 600 for performing fourth step 508 (generate lamp control signal) of method 500. In a first step 602 a transition counter that counts transitions in the lamp control signal is reset. Then, in a second step 604, the lamp control circuit determines whether the current lamp control signal is high or low. If the lamp control signal is not high, then in a third step 606 the lamp control circuit sets the lamp control signal high, and in a fourth step 608 loads the high pulse time value in the lamp control counter. Next, in a fifth step 610, the lamp control circuit waits for the counter to count the high pulse time value (up or down) to a predetermined value (e.g., 0), which indicates the proper duration of the asserted high lamp control pulse. Then, in a sixth step 612, the transition counter is incremented, and in a seventh step 614 it is determined whether the transition count is equal to a predetermined maximum number of transitions that should occur between consecutive Vsync signals. If so, then in an eighth step 616, the lamp control circuit sets the lamp control signal low and method 600 ends. Otherwise, method 600 returns to second step 604.

If, in second step 604, lamp control circuit determines that the current lamp control signal is high, then method 600 proceeds to a ninth step 618, where the lamp control signal is set low. Next, in a tenth step 620, the lamp control circuit loads the low pulse time value in the lamp control counter. Then method 600 proceeds to fifth step 610 to count the loaded low pulse time value.

In this example method, the high pulse time value is fixed and the low pulse time value can be varied. However, it should be understood that either the high pulse time value, the low pulse time value, or both, can be variable. As described below, varying the pulse time values provides a means for adjusting the period of the lamp control signal.

Figure 7:
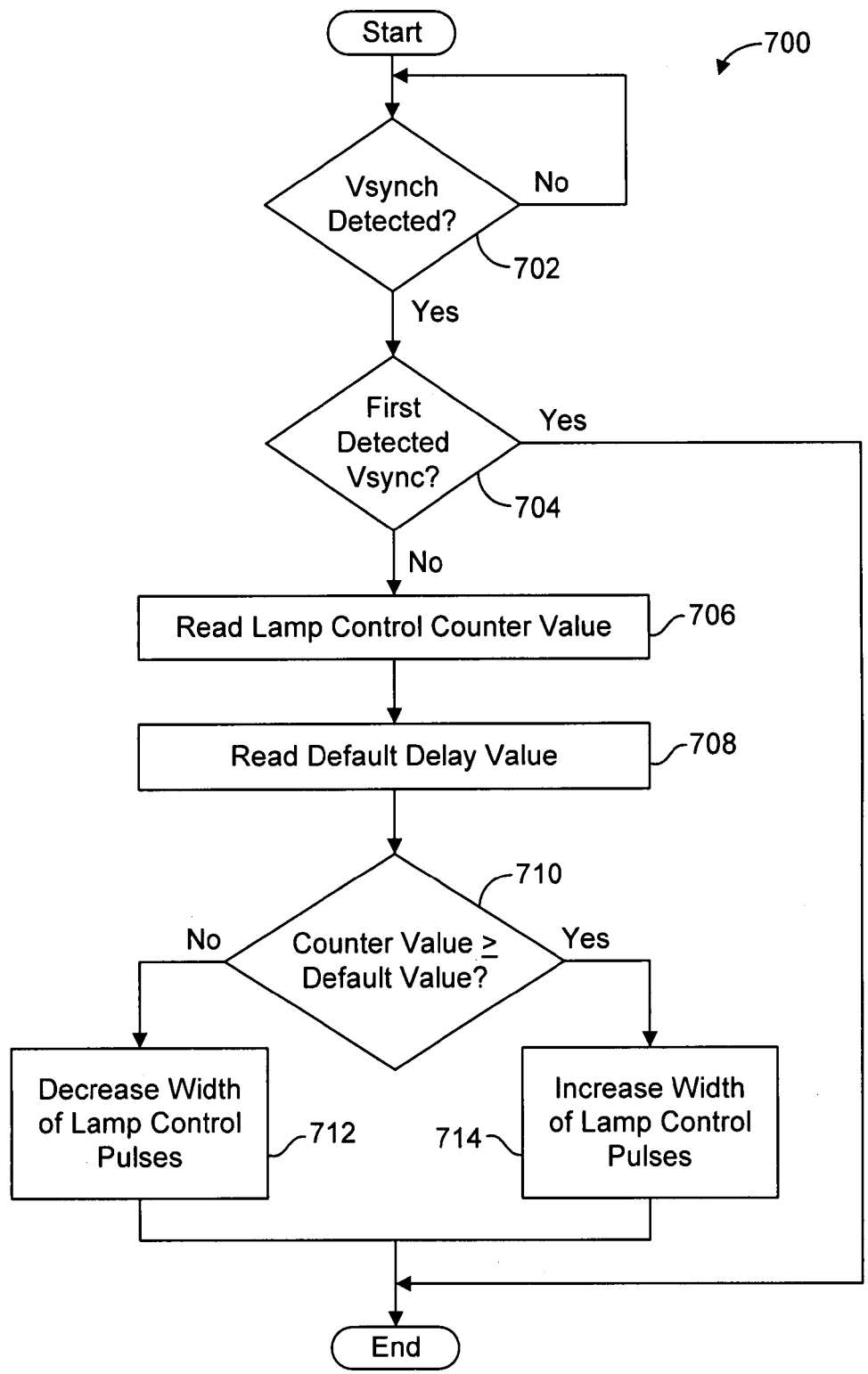
FIG. 7 is a flowchart summarizing one example method for performing the fifth step (adjust period of lamp control signal) of the method of FIG. 5.

FIG. 7 is a flowchart summarizing an example method 700 for performing fifth step 510 (adjusting the period of the lamp control signal) of method 500. In a first step 702, the means for adjusting the period of the lamp control signal waits to detect a Vsync signal. When a Vsync signal is detected, then in a second step 704, it is determined whether the Vsync signal is the first detected Vsync signal. If so, then method 700 ends without adjusting the period of the lamp control signal. Otherwise, in a third step 706 the period compensating means reads the current lamp control counter value and, in a fourth step 708 reads the predetermined default delay value. Next, in a fifth step 710, the period compensating means compares the lamp control counter value to the default delay value, to determine whether the period of the lamp control signal is greater than or less than the period of the Vsync signal. If the counter value is not greater than or equal to the default value (i.e., the period of the Vsync signal is shorter than the period of the lamp control signal), then in a sixth step 712 the period compensating means decreases the width of the lamp control pulses by altering the low pulse time value by an amount calculated to equalize the periods of the lamp control signal and the Vsync signal. Then method 700 ends. If, however, it is determined in fifth step 710 that the counter value is greater than or equal to the default value, then the period compensating means alters the low pulse time value to increase the width of the lamp control pulses. Note that if the counter value equals the default value, then the period compensating means adjusts the low pulse time value by 0, because no period adjustment is necessary. Then method 700 ends.

Note that the pulse time values altered in sixth step 712 and seventh step 714 are the same pulse values used to generate the lamp control signal in method 600 (FIG. 6). As explained above, either or both of the low pulse time value and the high pulse time value can be adjusted to equalize the period between the lamp control signal and the Vsync signal.

The description of particular embodiments of the present invention is now complete. Many of the described features may be substituted, altered or omitted without departing from the scope of the invention. For example, synchronized lamp driver 114 may be provided as a separate component from display driver circuit 112 (e.g., as circuitry or computer code). As another example, synchronized lamp driver 114 can be responsive to a particular number (e.g., 768) of Hsync signals received on Hsync line 118, as opposed to a single Vsync signal received on Vsync line 120. As yet another example, the present invention can be used to synchronize other types of pulse driven light sources with the modulation of a display. These and other deviations from the particular embodiments shown will be apparent to those skilled in the art, particularly in view of the foregoing disclosure.

We claim:

1. In a display driver, a method for synchronizing display modulation and illumination, said method comprising:
   receiving a video signal including a synchronization signal;
   generating a light source control signal;
   initiating said light source control signal at a first value;
   maintaining said light source control signal at said first value for a first predetermined time period after receiving said synchronization signal;

changing said light source control signal to a second value after the lapse of said first predetermined time period;

counting the number of times said light source control signal changes value;

determining the number of light source control signal changes since the receipt of said synchronization signal before changing said light source control signal to said second value;

not changing said light source control signal to said second value if said number of light source control signal changes is greater than a predetermined maximum of light source control signal changes; and using said synchronization signal to adjust a period of said light source control signal.

2. The method of claim 1, wherein said predetermined maximum of light source control signal changes is four.

3. The method of claim 1, further including restarting the count of the number of said light source control signal changes each time said synchronization signal is received.

4. The method of claim 1, further including maintaining said light source control signal at said second value for a second predetermined time period.

5. The method of claim 4, further including:

changing said light source control signal to said first value after the lapse of said second predetermined time period; and maintaining said light source control signal at said first value for a third predetermined time period.

6. In a display driver, a method for synchronizing display modulation and illumination, said method comprising:

receiving a video signal including a synchronization signal;

generating a light source control signal;

initiating said light source control signal at a first value;

maintaining said light source control signal at said first value for a first predetermined time period after receiving said synchronization signal;

changing said light source control signal to a second value after the lapse of said first predetermined time period;

maintaining said light source control signal at said second value for a second predetermined time period;

changing said light source control signal to said first value after the lapse of said second predetermined time period;

maintaining said light source control signal at said first value for a third predetermined time period;

changing said light source control signal to said second value after the lapse of said third predetermined time period;

maintaining said light source control signal at said second value for a fourth predetermined time period; and using said synchronization signal to adjust a period of said light source control signal.

7. The method of claim 6, wherein said fourth predetermined time period is equal to said second predetermined time period.

8. The method of claim 6, further including:

changing said light source control signal to said first value after the lapse of said fourth predetermined time period; and maintaining said light source control signal at said first value for a fifth predetermined time period.

9. The method of claim 8, wherein the sum of said second predetermined time period and said third predetermined time period is equal to the sum of said fourth predetermined time period and said fifth predetermined time period.

10. The method of claim 8, wherein said fifth predetermined time period is equal to said third predetermined time period.

11. The method of claim 8, further including:

receiving a second synchronization signal during said fifth predetermined time period; and determining the unelapsed portion of said fifth predetermined time period.

12. The method of claim 11, wherein the unelapsed portion of said fifth predetermined time period is equal to said first predetermined time period.

13. The method of claim 11, wherein said step of using said synchronization signal to adjust said period of said light source control signal includes comparing said unelapsed portion of said fifth predetermined time period with said first predetermined time period.

14. The method of claim 13, wherein said step of using said synchronization signal to adjust said period of said light source control signal includes adjusting the duration of at least one of said second, third, fourth, and fifth predetermined time periods for subsequent generation of said light source control signal.

15. The method of claim 14, wherein:

said unelapsed portion of said fifth predetermined time period is less than said first predetermined time period; and said step of adjusting said duration of at least one of said second, third, fourth, and fifth predetermined time periods includes increasing each of said third predetermined time period and said fifth predetermined time period by half of the difference between said first predetermined time period and said unelapsed portion of said fifth predetermined time period.

16. The method of claim 14, wherein:

said unelapsed portion of said fifth predetermined time period is greater than said first predetermined time period; and said step of adjusting said duration of at least one of said second, third, fourth, and fifth predetermined time periods includes decreasing each of said third predetermined time period and said fifth predetermined time period by half of the difference between said unelapsed portion of said fifth predetermined time period and said first predetermined time period.

17. In a display driver, a method for synchronizing display modulation and illumination, said method comprising:

receiving a video signal including a synchronization signal;

generating a light source control signal; and using said synchronization signal to adjust a period of said light source control signal; and wherein said light source control signal includes a series of pulses; and said step of using said synchronization signal to adjust said period of said light source control signal includes adjusting at least one of the width of said pulses and the separation of said pulses such that the period of said synchronization signal is an integer multiple of the period of said light source control signal.

18. The method of claim 17, wherein said step of using said synchronization signal to adjust said period of said light source control signal includes comparing a time remaining for the assertion of one of said pulses with a predetermined delay time period.

19. The method of claim 18, wherein:

said pulses include a high value and a low value;

said high value is asserted for a high time period;

said low value is asserted for a low time period; and said step of using said synchronization signal to adjust the period of said light source control signal further includes adjusting the duration of said high time periods, said low time periods, or both, depending on difference between said time remaining and said predetermined delay time period.

20. The method of claim 19, wherein:

said light source control signal transitions four times between said low value and said high value before receiving a subsequent video signal thereby defining two of said high time periods and two of said low time periods; and said step of adjusting the duration of said high time periods, said low time periods, or both, includes adjusting the duration of said two low time periods.

21. The method of claim 19, wherein:

if said time remaining is less than said predetermined delay time period, then said step of adjusting the duration of said high time periods, said low time periods, or both, includes increasing at least one of said time periods.

22. The method of claim 19, wherein:

if said remaining time is greater than said predetermined delay time period, then said step of adjusting the duration of said high time periods, said low time periods, or both, includes decreasing at least one of said time periods.

23. The method of claim 19, further including adjusting subsequent low time periods.

24. The method of claim 17, wherein the duration of said pulses are determined by a digital value.

25. The method of claim 24, wherein the duration of said pulses are controlled using a counter.

26. The method of claim 24, further including counting the number of said pulses asserted subsequent to each synchronization signal.

27. In a display driver, a method for synchronizing display modulation and illumination, said method comprising:

receiving a video signal including a synchronization signal;

generating a light source control signal; and using said synchronization signal to adjust a period of said light source control signal; and wherein said light source control signal is temporally offset with respect to said synchronization signal by a predetermined delay period.

28. In a display driver, a method for synchronizing display modulation and illumination, said method comprising:

receiving a video signal including a synchronization signal;

generating a light source control signal; and using said synchronization signal to adjust a period of said light source control signal; and wherein said synchronization signal is a vertical synchronization signal.

29. In a display driver, a method for synchronizing display modulation and illumination, said method comprising:

receiving a video signal including a synchronization signal;

generating a light source control signal; and using said synchronization signal to adjust a period of said light source control signal; and wherein said synchronization signal causes said display driver to refresh a frame of image data asserted on said display; and said light source control signal is adapted to cause a light source to generate at least one light pulse.

30. In a display driver, a method for synchronizing display modulation and illumination, said method comprising:

receiving a video signal including a synchronization signal;

generating a light source control signal; and using said synchronization signal to adjust a period of said light source control signal; and wherein subsequent ones of said synchronization signal are generated at a refresh rate; and a rate of said light source control signal changes automatically to a rate which is an integer multiple of said refresh rate.

31. The method of claim 30, wherein said multiple of said refresh rate is an even multiple of said refresh rate.

32. An electronically readable storage medium having code embodied therein for causing an electronic device to perform a method for synchronizing display modulation and illumination, said method comprising:

receiving a video signal including a synchronization signal;

generating a light source control signal;

initiating said light source control signal at a first value;

maintaining said light source control signal at said first value for a first predetermined time period after receiving said synchronization signal;

changing said light source control signal to a second value after the lapse of said first predetermined time period;

counting the number of times said light source control signal changes value;

determining the number of light source control signal changes since the receipt of said synchronization signal before changing said light source control signal to said second value;

not changing said light source control signal to said second value if said number of light source control signal changes is greater than a predetermined maximum of light source control signal changes; and using said synchronization signal to adjust a period of said light source control signal.

33. An electronically readable storage medium having code embodied therein for causing an electronic device to perform a method for synchronizing display modulation and illumination, said method comprising:

receiving a video signal including a synchronization signal;

generating a light source control signal; and using said synchronization signal to adjust a period of said light source control signal; and wherein said light source control signal includes a series of pulses; and said step of using said synchronization signal to adjust said period of said light source control signal includes adjusting at least one of the width of said pulses and the separation of said pulses such that the period of said synchronization signal is an integer multiple of the period of said light source control signal.

34. A display driver for synchronizing a light source control signal with modulation of a display, said display driver comprising:

an input terminal set operative to receive a video signal including a synchronization signal;

a light source driver responsive to said synchronization signal and operative to generate a light source control signal and to adjust a period of said light source control signal based at least in part on said synchronization signal; and an output terminal operative to provide said light source control signal; and wherein said light source driver further comprises a counter operative to process pulse duration values corresponding to control signal pulse durations and to provide a count signal indicative of such processing, and a control signal generator responsive to said count signal and operative to initiate said light source control signal at a first value, to maintain said light source control signal at said first value for a remaining portion of a first predetermined time period, and to change said light source control signal to a second value when said count signal indicates the end of said first predetermined time period.

35. The display driver of claim 34, further comprising a transition counter responsive to said light source control signal changing value, and operative to count the number of times said light source control signal changes value.

36. The display driver of claim 35, wherein responsive to said transition counter indicating a predetermined number of said light source control signal changes, said control signal generator is further operative to prevent said light source control signal from changing to said second value.

37. The display driver of claim 34, wherein:

said control signal generator responsive to the lapse of said first predetermined time period, is further operative to cause said counter to load a second predetermined pulse duration value;

said counter is operative to provide a count signal based on said second predetermined pulse duration value; and said control signal generator responsive to said count signal based on said second predetermined pulse duration value is operative to maintain said light source control signal at said second value for a second predetermined time period.

38. The display driver of claim 37, wherein:

said control signal generator responsive to the lapse of said second predetermined time period, is further operative to cause said counter to load a third predetermined pulse duration value;

said counter is operative to provide a count signal based on said third predetermined pulse duration value; and said control signal generator responsive to said count signal based on said third predetermined pulse duration value is operative to change said light source control signal to said first value and maintain said light source control signal at said first value for a third predetermined time period.

39. The display driver of claim 38, wherein:

said control signal generator responsive to the lapse of said third predetermined time period, is further operative to cause said counter to load a fourth predetermined pulse duration value;

said counter is operative to provide a count signal based on said fourth predetermined pulse duration value; and said control signal generator responsive to said count signal based on said fourth predetermined pulse duration value is operative to change said light source control signal to said second value and maintain said light source control signal at said second value for a fourth predetermined time period.

40. The display driver of claim 39, wherein:

said control signal generator responsive to the lapse of said fourth predetermined time period, is further operative to cause said counter to load a fifth predetermined pulse duration value;

said counter is operative to provide a count signal based on said fifth predetermined pulse duration value; and said control signal generator responsive to said count signal based on said fifth predetermined pulse duration value is further operative to change said light source control signal to said first value and maintain said light source control signal at said first value for a fifth predetermined time period.

41. The display driver of claim 40, wherein said light source driver further includes a period compensator responsive to the receipt of a second synchronization signal and operative to modify at least one of said second predetermined pulse duration value, said third predetermined pulse duration value, said fourth predetermined pulse duration value, and said fifth predetermined pulse duration value to adjust the period of said light source control signal.

42. The display driver of claim 40, wherein said light source driver further comprises a period compensator responsive to receipt of a second synchronization signal and operative to:

read a value from said counter associated with a remaining portion of a last predetermined time period;

compare said read value with an expected value; and adjust a subsequent period of said light source control signal based on the difference between said read value and said expected value.

43. The display driver of claim 42, wherein said period compensator adjusts said subsequent period of said light source control signal by adjusting the duration of subsequent iterations of at least two of said second predetermined time period, said third predetermined time period, said fourth predetermined time period, and said fifth predetermined time period.

44. The display driver of claim 43, wherein:

said read value is less than said expected value; and said period compensator adjusts said duration of said third predetermined time period and said fifth predetermined time period by increasing each of said third predetermined time period and said fifth predetermined time period by half of the difference between said read value and said expected value.

45. The display driver of claim 43, wherein:

said read value is greater than said expected value; and period compensator is adjusts said duration of said third predetermined time period and said fifth predetermined time period by decreasing each of said third predetermined time period and said fifth predetermined time period by half of the difference between said expected value and said read value.

46. A display driver for synchronizing a light source control signal with modulation of a display, said display driver comprising:

an input terminal set operative to receive a video signal including a synchronization signal;

a light source driver responsive to said synchronization signal and operative to generate a light source control signal and to adjust a period of said light source control signal based at least in part on said synchronization signal; and an output terminal operative to provide said light source control signal; and wherein said light source driver includes a counter operative to provide count values associated with said light source control signal, and a period compensator responsive to said synchronization signal and operative to identify any difference between the period of said synchronization signal and the period of said light source control signal based on said count values at particular times determined from said synchronization signal.

47. The display driver of claim 46, wherein said period compensator compares said count values at particular times with predetermined count values.

48. The display driver of claim 47, wherein:
said light source control signal alternates between a high value asserted during high time periods and a low value asserted during low time periods; and
said period compensator adjusts the period of said light source control signal by adjusting the duration of at least one of said high time periods and said low time periods.

49. The display driver of claim 48, wherein:
said comparison of one of said count values from said counter with one of said predetermined count values indicates that said period of said light source control signal is less than the period of said synchronization signal; and
said period compensator is operative to increase said at least one of said high time periods and said low time periods.

50. The display driver of claim 48, wherein:
said comparison of one of said count values with one of said predetermined count values indicates that said period of said light source control signal is greater than the period of said synchronization signal; and
said period compensator is further operative to decrease said at least one of said high time periods and said low time periods.

51. The display driver of claim 46, further comprising a transition counter responsive to said light source control signal changing value, and operative to count the number of times said value of said light source control signal changes.

52. The display driver of claim 51, wherein said period compensator responsive to said synchronization signal is further operative to reset said transition counter.

53. A display driver for synchronizing a light source control signal with modulation of a display, said display driver comprising:
an input terminal set operative to receive a video signal including a synchronization signal;
a light source driver responsive to said synchronization signal and operative to generate a light source control signal and to adjust a period of said light source control signal based at least in part on said synchronization signal; and
an output terminal operative to provide said light source control signal; and wherein said synchronization signal is a vertical synchronization signal.

54. A display driver for synchronizing a light source control signal with modulation of a display, said display driver comprising:
an input terminal set operative to receive a video signal including a synchronization signal;
a light source driver responsive to said synchronization signal and operative to generate a light source control signal and to adjust a period of said light source control signal based at least in part on said synchronization signal; and
an output terminal operative to provide said light source control signal; and wherein said synchronization signal causes said display driver to refresh a frame of image data asserted on said display; and said light source control signal is adapted to cause a light source to generate at least one light pulse beginning a predetermined amount of time after said synchronization signal is received.

55. A display driver for synchronizing a light source control signal with modulation of a display comprising:
an input terminal operative to receive a video signal including a synchronization signal;
a light source driver responsive to said synchronization signal and operative to generate a light source control signal;
means for adjusting a period of said light source control signal based at least in part on said synchronization signal; and
an output terminal operative to provide said light source control signal.

56. The display driver of claim 55, wherein said means for adjusting a period of said light source control signal includes means for adjusting the duration of pulses of said light source control signal.

57. An electronically readable storage medium having code embodied therein for causing an electronic device to perform, in a display driver, a method for synchronizing display modulation and illumination, said method comprising:
receiving a video signal including a synchronization signal;
generating a light source control signal;
initiating said light source control signal at a first value;
maintaining said light source control signal at said first value for a first predetermined time period after receiving said synchronization signal;
changing said light source control signal to a second value after the lapse of said first predetermined time period;
maintaining said light source control signal at said second value for a second predetermined time period;
changing said light source control signal to said first value after the lapse of said second predetermined time period;
maintaining said light source control signal at said first value for a third predetermined time period;
changing said light source control signal to said second value after the lapse of said third predetermined time period;
maintaining said light source control signal at said second value for a fourth predetermined time period; and
using said synchronization signal to adjust a period of said light source control signal.

58. An electronically readable storage medium having code embodied therein for causing an electronic device to perform, in a display driver, a method for synchronizing display modulation and illumination, said method comprising:
receiving a video signal including a synchronization signal;
generating a light source control signal; and
using said synchronization signal to adjust a period of said light source control signal; and wherein
said light source control signal is temporally offset with respect to said synchronization signal by a predetermined delay period.

59. An electronically readable storage medium having code embodied therein for causing an electronic device to perform, in a display driver, a method for synchronizing display modulation and illumination, said method comprising:
receiving a video signal including a synchronization signal;

generating a light source control signal; and using said synchronization signal to adjust a period of said light source control signal; and wherein said synchronization signal is a vertical synchronization signal.

60. An electronically readable storage medium having code embodied therein for causing an electronic device to perform, in a display driver, a method for synchronizing display modulation and illumination, said method comprising:

receiving a video signal including a synchronization signal;

generating a light source control signal; and using said synchronization signal to adjust a period of said light source control signal; and wherein said synchronization signal causes said display driver to refresh a frame of image data asserted on said display; and said light source control signal is adapted to cause a light source to generate at least one light pulse.

61. An electronically readable storage medium having code embodied therein for causing an electronic device to perform, in a display driver, a method for synchronizing display modulation and illumination, said method comprising:

receiving a video signal including a synchronization signal;

generating a light source control signal; and using said synchronization signal to adjust a period of said light source control signal; and wherein subsequent ones of said synchronization signal are generated at a refresh rate; and a rate of said light source control signal changes automatically to a rate which is an integer multiple of said refresh rate.

* * * * *